United States Patent [19]
Mendelovicz

[11] Patent Number: 6,005,903
[45] Date of Patent: Dec. 21, 1999

[54] DIGITAL CORRELATOR

[76] Inventor: Ephraim Mendelovicz, 10506 Garden Grove Ave., Northridge, Calif. 91326

[21] Appl. No.: 08/678,556

[22] Filed: Jul. 8, 1996

[51] Int. Cl.$^6$ .............................. H04L 7/00; G06F 17/15
[52] U.S. Cl. ...................................... 375/367; 364/728.03
[58] Field of Search ........ 375/367; 364/728.03–728.08, 364/724.13–724.16; 370/515

[56] References Cited

U.S. PATENT DOCUMENTS

| | | | |
|---|---|---|---|
| 4,660,164 | 4/1987 | Leibowitz | 364/728.03 |
| 5,305,349 | 4/1994 | Dent | 375/206 |
| 5,438,532 | 8/1995 | Nagao et al. | 364/724.16 |
| 5,467,367 | 11/1995 | Izumi et al. | 375/206 |
| 5,650,952 | 7/1997 | Baier et al. | 364/750.5 |
| 5,680,414 | 10/1997 | Durrant et al. | 375/206 |

FOREIGN PATENT DOCUMENTS 2115192  9/1983  United Kingdom.

*Primary Examiner*—Chi H. Pham
*Assistant Examiner*—Khai Tran
*Attorney, Agent, or Firm*—Albert O. Cota

[57] ABSTRACT

An apparatus for receiving a data stream consisting of a simultaneous plurality of time domain spread spectrum messages in the same frequency channel, wherein each message is independent and spread spectrally with a unique code. The data stream contains a subset of all known codes in use. The apparatus finds a specific code and a constant phase shift between the incoming code and a reference code by serially moving the data stream through a shift register, subjecting all the shift register outputs to a single expected reference code and accumulating the result for each output. The code and phase shift is indicated by the largest magnitude of the accumulation, above a set threshold, corresponding to the shift register output for the correct phase shift between the incoming code and the reference. Upon completion of an integration cycle the time shift delay increases by the length of the shift register. The process continues for all the possible relative time shifts and for all the reference codes.

2 Claims, 4 Drawing Sheets

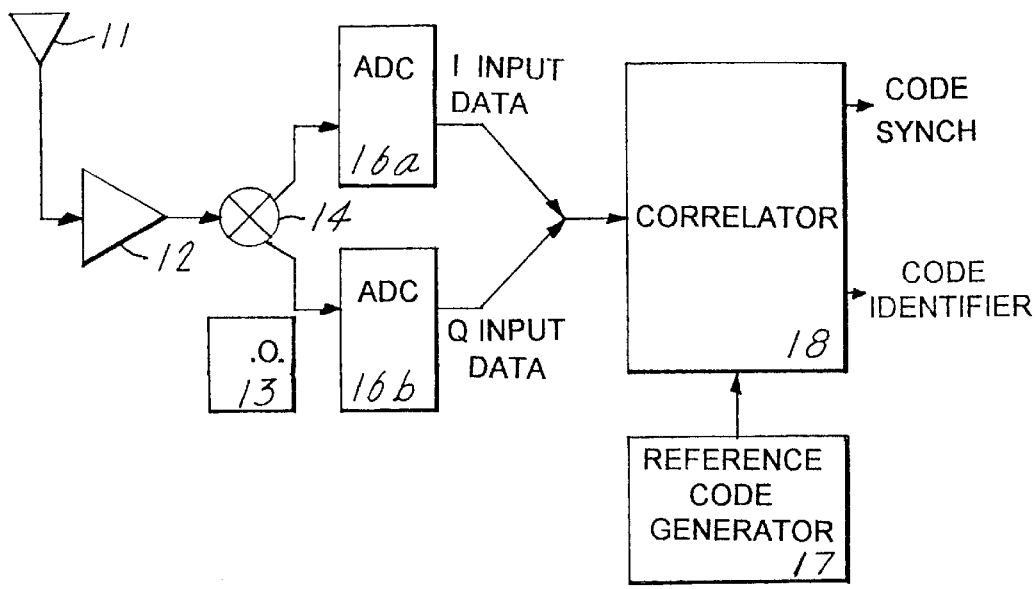
FIG. 1---PRIOR ART
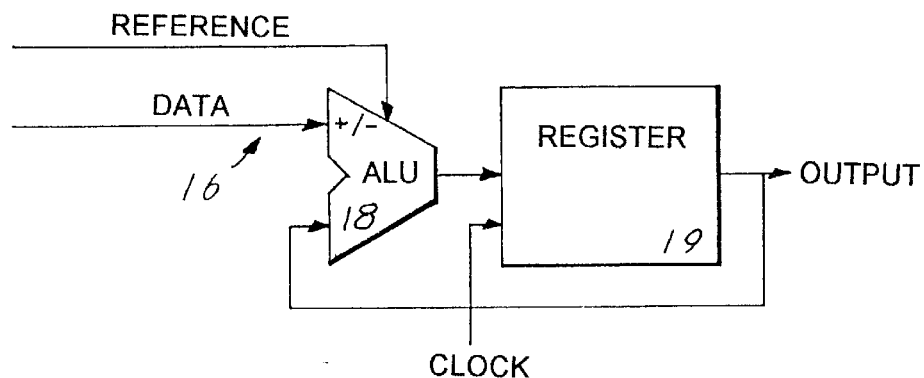
FIG. 2a---PRIOR ART
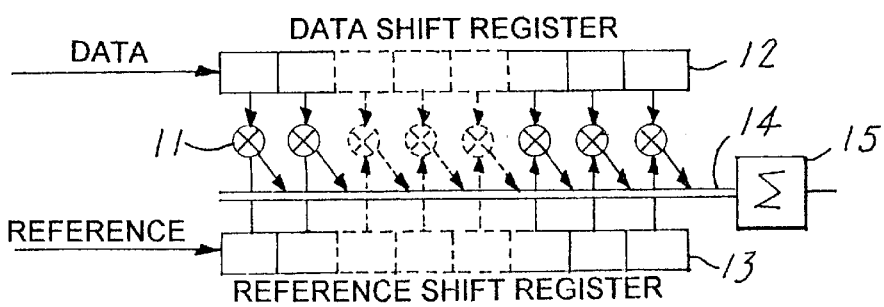
FIG. 2b---PRIOR ART

DIGITAL CORRELATOR

BACKGROUND OF THE INVENTION

This invention relates to spread spectrum communication of a plurality of messages recieved simultaneously, from different sources and particularly where the communications employ one of several pseudo random codes at baseband or on a carrier frequency and where the data communicated can be recovered only by the identification of the particular code and its time of arrival.

DESCRIPTION OF THE PRIOR ART

The signals to be correlated are spread spectrum communication signals. The data communicated is digital data, which consists of a sequence of ones and zeros. According to this method, which is well known to those skilled in the art, the spectrum of the data is spread by modulation with a signal spreading code (SSC) to form a digital spread signal. This signal is then used to bi-phase modulate an RF carrier to form the RF spread spectrum signal. The ones and zeros of the digital spread signal are transformed into the differential phase of the RF carrier as 0° and 180°.

When the RF spread spectrum signal is recieved it is processed to recover the ones and zeros of the digital spread signal. A possible receiver processor is illustrated in FIG. 1. The RF spread spectrum signal is received via antenna 11, then converted to a baseband signal by heterodyning it against the local oscillator 13. The RF center frequency of the transmitter is accurately known and the receiver local oscillator is set to that frequency. The two frequencies are nearly identical differing only buy a Doppler shift generated by the motion of the transmitter or receiver and the relative frequency drift of the two oscillators. The baseband signal is essentially the sum of the Doppler and drift frequencies bi-phase modulated by the digital spread spectrum signal.

The relative phase of the baseband signal is not known at this point in the system and therefore the phase relationship of the baseband signal and the receiver clock and receiver generated SSC are also not known. The effect of this uncertainty is removed by carrying out the heterodyne process using a quadrature IF mixer (QIFM), 14. The QIFM produces two baseband signals: $Sin((LO-Sig)\cdot t+\phi)$ and $Cos((LO-Sig)\cdot t+\phi)$ when a 0 is received and $Sin((LO-Sig)\cdot t+\phi+\pi)$ and $Cos(LO-Sig+\phi+\pi)$ when a 1 is recieved where LO is the radian frequency of the local oscillator, Sig is the radian frequency of the baseband signal and $\phi$ is the phase difference between LO and Sig. These voltages are bi-polar and, when converted to a digital form, by analog to digital converters 16a and 16b of FIG. 1, are represented by a pair of binary numbers, which are measures of the sine and cosine baseband signals, each converted twice during each code bit duration. These binary measures of sine and cosine are processed independently through the processor to be described. After completion of the correlation process there are two results which are combined by taking the square root of the sum of the squares of the sine and cosine correlations to obtain the magnitude of the correlation function.

For simplicity the correlator, 18 of FIG. 1, is described in terms of processing a sinusoid function. The expansion from sine to sine and cosine processing adds complexity but does not alter the principles of prior art processors or the principles of the processor described in this invention.

The first step in extracting the digital data is to identify the SSC or SSC's present; and to determine the start time of the SSC. Once the SSC has been determined it can be cross correlated with the baseband signal to demodulate the baseband spread signal and recover the data. The trial reference SSC generator 17, provides one or several SSC's which may be present in the received signal. The correlator 18, tests each of these codes against the received binary spread signal. The correlator functions and processes are the subject of this invention.

The nature of the processing and associated problems can be understood by the following example and discussion which follows. In a spread spectrum communication, each data bit is modulated by one or more entire SSC sequences. The code is a sequence of ones and zeros, which are generated at several times the chip rate so that the duration of the entire sequence is the same as the duration of a single data bit or an integer fraction thereof. Herein we provide an illustration with one SSC sequence per data bit. In the process of modulation, each data bit is transformed either to the SSC or to the bit complement of the SSC. For the purpose of this example, a 7 bit code /0001101/ is used. If the corresponding data were /1/0/ the result of modulation would be /0001101/1110010/ as illustrated in Table I below.

TABLE I

MODULATION of data by an SSC

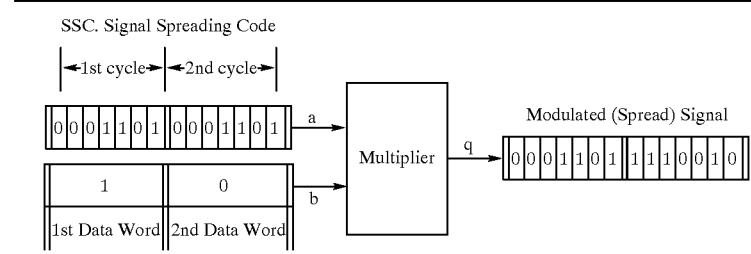

The modulation process is essentially that of multiplication. The multiplication is modified to provide an assert, a 1 when the two signals are alike and a negate, a 0, when they are different.

Illustration of cross-correlation of signal against an SSC, for a single value of delay, τ.

Correlation proceeds by multiplying the binary spread signal by the SSC. The results are summed to an accumulator to form the cross-correlation function. In the example above, the trial SSC is the correct SSC, the baseband spread spectrum signal, the Data, and SSC are perfectly synchronized and no noise is present. The accumulator ramps up or down smoothly reaching the appropriate 1 or 0 threshold. The result approximates the mathematical form of the cross-correlation given in Table II below.

TABLE II $$F(\tau) = \int_{-a}^{+a} f(t) \cdot g(t+\tau) dt$$

where
F()     is the cross-correlation function
f()     is the function correlated here, the baseband signal.
g()     is the trial SSC.
τ     is the trial delay

TABLE III

| | Four Quadrant ExNOR Function Multiplication | | | | | |
|---|---|---|---|---|---|---|
| | a | b | c | a | b | c |
| Note that the "1"s and | 0 | 0 | 1 | −1 | −1 | +1 |
| "0"s of the ExNOR Function | 0 | 1 | 0 | −1 | +1 | −1 |
| correspond to the + and − | 1 | 0 | 0 | +1 | −1 | −1 |
| signs in multiplication | 1 | 1 | 1 | +1 | +1 | +1 |

The preceding is an example of the process using a 7 bit code for the purpose of illustration, codes actually in use are much longer, such as 1023 bits in the case of the Global Positioning Satellite, even longer codes are common. Communication transmitters contain variations of the spreading code, constructed so that they are not easily confused with one another. Codes having this property of avoiding confusion are nearly orthogonal.

Thus if the code used by one transmitter is /0001101/ the code used by another source might be /0011101/ (these words are not members of a code family and were contrived to illustrate a point), longer codes allow a great number of individual very nearly orthogonal codes. This property allows several signals, overlapping in time and frequency to be transmitted on the same frequency and separated in the receiver by the correlation process. In the case of the GPS system as many as 12 visible satellites may be received simultaneously at the same frequency and be successfully separated in the receiver (there are altogether 24 satellites in the GPS constellation and the number of nearly orthogonal codes is larger than that).

Additionally the code received may differ from the code transmitted because of Doppler shift. Thus if the source is moving relative to the receiver, the frequency of the received signal will be shifted in frequency. If the Doppler frequency is such that one cycle occurs over the duration of the code, then the last bits in the code will be reversed relative to the first bits so that /0001101/ might become /0001010/ where the last three bits are reversed to represent the change in the phase of the received signal due to the Doppler shift. The uncompensated Doppler frequency limits the duration of the correlation process.

BRIEF DESCRIPTION OF THE DRAWINGS

The first two of the accompanying drawings, FIGS. 1 2a and 2b are presented to properly describe the prior art. The remaining drawings, FIGS. 3 and 4, which are incorporated and constitute a part of the specification, illustrate the preferred embodiments of the invention, and together with the description serve to explain the principles of the invention.

FIG. 1 Spread Spectrum Receiver

FIG. 2a Serial Correlator

FIG. 2b Matched Filter Correlator

ACQUISITION OF THE DATA SIGNAL

Figure 3A:
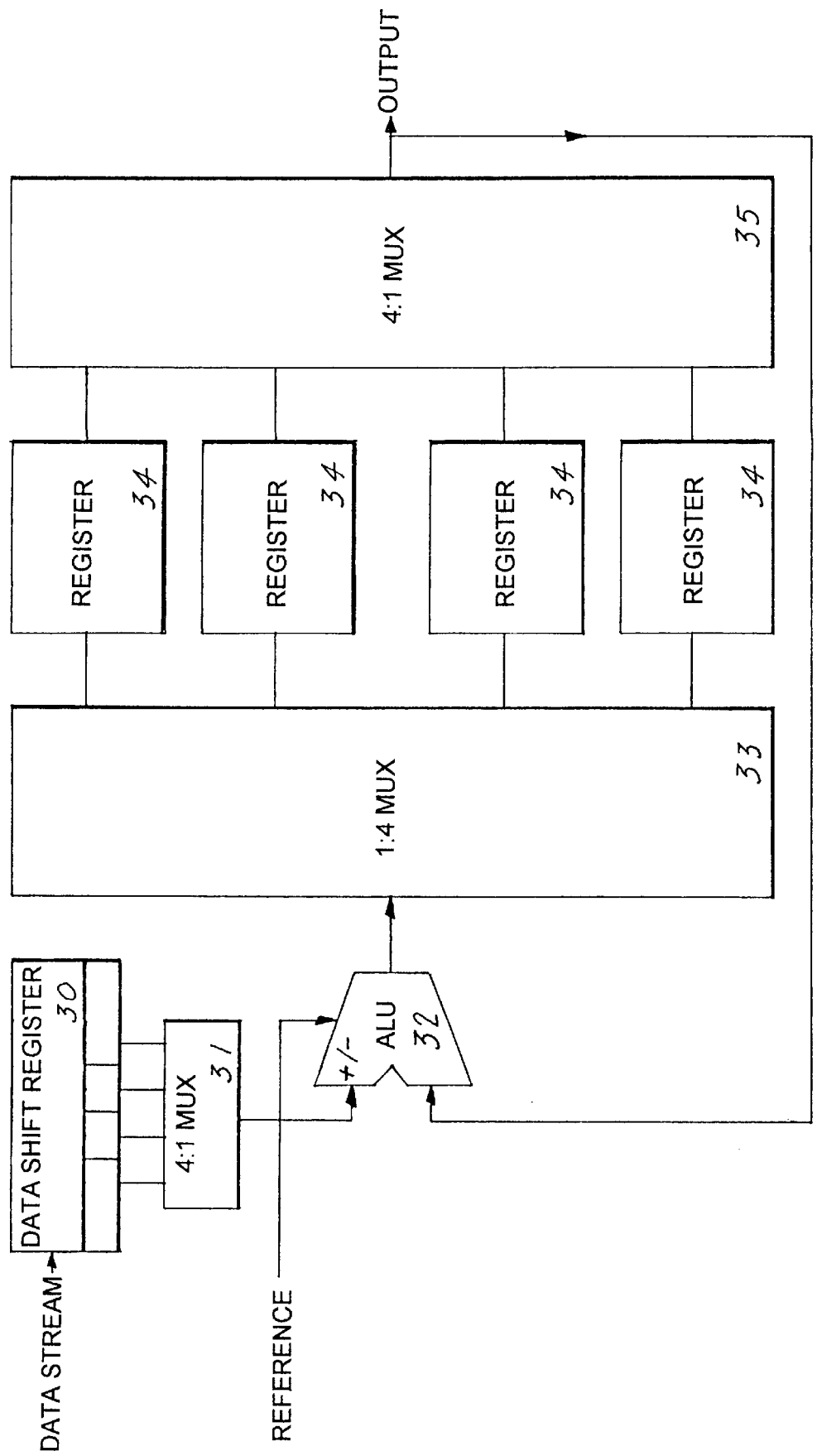
FIG. 3a Improved Correlator with ALU and Registers

Several SSC acquisition methods based on correlation have been developed in the prior art. The first of two prior art methods to be described is the serial correlator illustrated by FIG. 2a. Referring to FIG. 2a, the reference SSC elements, R(j), generated for use in the correlator as shown in FIGS. 1, 17 and 18 enter one port of ExNOR (FIGS. 2a, 17) and the data elements D(i) enter the other port (FIG. 2a, 16). These digital elements are effectively multiplied by the ExNOR. The "truth table" for the ExNOR function is given in the Table III above. So that when the elements match the result is 1 when they do not match the result is 0.

The resulting products are added to the previous accumulation of products until the sum of all such products data and reference SSC are complete. One possible means of accumulation of such a sum consists of the arithmetic logic unit (ALU) 18 and register 19 in FIG. 2a. The correlation result, C is: $C = \Sigma D_i \cdot R_j$ Further illustration of this process is illustrated by the following example using the 7 element SSC given above, /0001101/. Note that the effects of noise and synchronism are not considered in this illustration below. In this illustration, Table IV below, the SSC ExNORed, element by element with the data corresponding to a 1 and a 0 in the illustration of modulation above. During the first data word the elements agree resulting in an increase in the accumulator level to a maximum of 7, the threshold is set less than the maximum value as a function of the noise level expected. At the start of the 2nd SSC cycle the accumulator is reset and since each element of the SSC and data are opposite, the accumulator level diminishes, to greater negative levels. Again the maximum negative value is 7 and the threshold is set at a somewhat smaller negative value.

TABLE IV

Illustration of CORRELATION of signal against an SSC

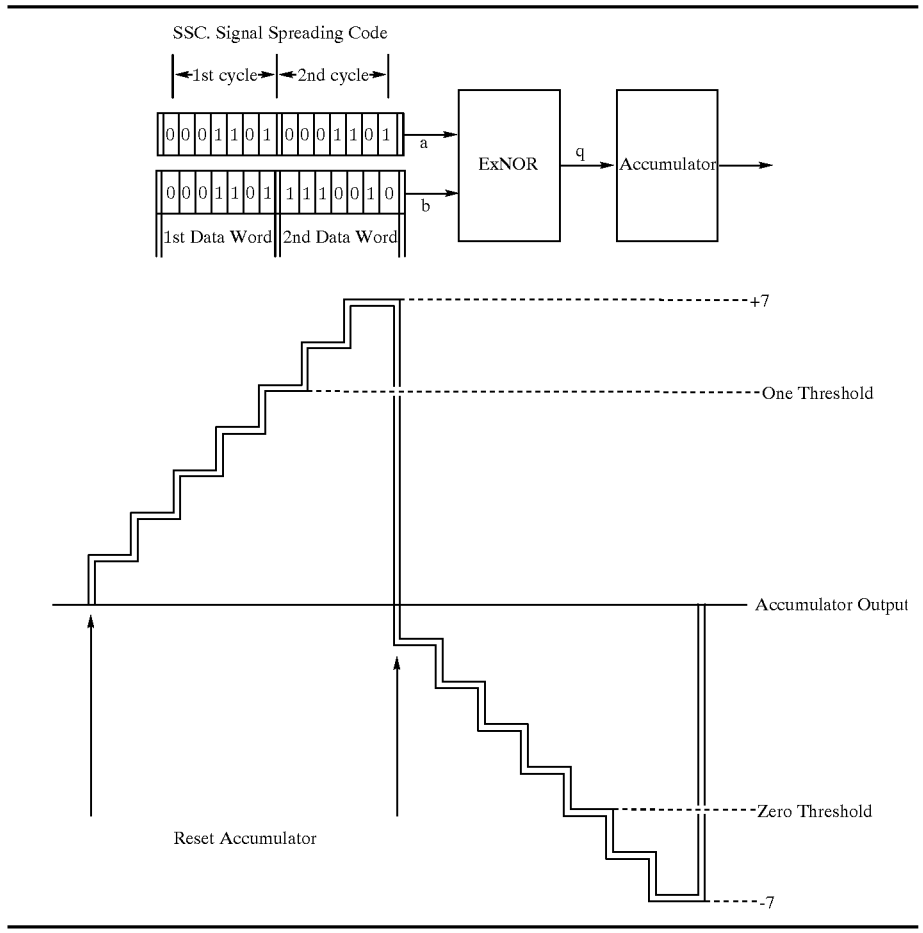

The tabulation in Table V below indicates the process. Data input D(i+2) is multiplied by SSC input R(j+17) and the result is added to the value in the accumulator. This process is carried out a number of times up to the length of the SSC or until a satisfactory result greater than threshold is reached. The accumulator is reset after each trial SSC.

The process of identifying all of the SSC's actually present their Doppler shift and their time of origin is one of trial and error. The process requires first determining which codes are likely to be present and what range of

TABLE V

| | Product Term in the Serial Correlator, FIG. 2a Table | | |
|---|---|---|---|
| Chip | Data | SSC | Product Accumulation |
| | | | Acc |
| 107 | D(i + 2) | R(j + 17) | D(i + 2) · R(j + 17) + Acc |
| 108 | D(i + 3) | R(j + 18) | D(i + 3) · R(j + 18) + Acc |
| 109 | D(i + 4) | R(j + 19) | D(i + 4) · R(j + 19) + Acc |
| 110 | D(i + 5) | R(j + 20) | D(i + 5) · R(j + 20) + Acc |
| 111 | D(i + 6) | R(j + 21) | D(i + 6) · R(j + 21) + Acc |
| 112 | D(i + 7) | R(j + 22) | D(i + 7) · R(j + 22) + Acc |
| 113 | D(i + 8) | R(j + 23) | D(i + 8) · R(j + 23) + Acc |

TABLE V-continued

| | Product Term in the Serial Correlator, FIG. 2a Table | | |
|---|---|---|---|
| Chip | Data | SSC | Product Accumulation |
| 114 | D(i + 9) | R(j + 24) | D(i + 9) · R(j + 24) + Acc |

(Note that Chip, Data and SSC designations in this Table are provided for illustration only.)

possible delays is equal to the length of the SSC.

The acquisition process requires that each code and each code as modified by Doppler be correlated against each possible time of arrival until a match is found. The number of possible times of arrival correspond to the length of the SSC. In a favorable signal to noise environment a satisfactory result may be obtained by observing the correlation over a fraction of the SSC length. In less favorable environments it may be necessary to observe over the entire duration of the SSC or even longer.

In general the code contained $N_b$ bits so that there are $N_b$ possible delays or times of arrival, there were $N_c$ codes and $N_D$ possible Doppler frequencies and Tint is the integration or accumulation time. The data and reference sequence would have to be compared on the average for a duration of $2 \cdot \frac{1}{2} \cdot N_b \cdot N_c \cdot N_D \cdot$Tint to identify the source transmitter, the Doppler and the code time offset (phase) before the message can be decoded. Each trial correlation may require processing of an entire sequence or more. This amount of computation requires a substantial time as illustrated in Table VI below.

The time required to search all possible codes is 41 seconds on the average and this is far from the most extreme condition. In some applications, such as navigating a small

TABLE VI

In a typical application:

$N_c = 8$
$N_D = 1$
$N_b = 1023$
$T_{int} = 5$ ms
$2 \cdot \frac{1}{2} \cdot N_b \cdot N_c \cdot N_D = 41$ seconds boat, there is plenty of time, in others, such as guiding a missile (in which case in all likelihood $N_D>1$ increasing the acquisition time), time is at a premium and a long synchronization time may jeopardize the effectivity of the system. The serial correlator processor does not work like a passive linear matched filter in the sense that it does not use partially overlapped input sequences to produce matched filter output at different time instants; rather it uses temporarily non-overlapped input segments to produce all the required outputs in sequence. When one output is obtained, the computation of the next one begins, leaving many output gaps (corresponding to various shifts between reference and data) to be completed over a longer duration. In this sense time is wasted.

The second prior art device is the matched filter correlator. The matched filter correlator was developed to ameliorate the time required to acquire the signal. This device as adapted to a 1023 chip code, performs the functions of 1023 serial correlators operating together. Again the result corresponds to one value of τ, one SSC and one Doppler but the result is obtained in one chip time, 1/1023th the time required of the serial correlator. The increase in speed is obtained at a proportional increase in complexity and power consumption.

In the matched filter correlator, as shown in FIG. 2b, the reference SSC is entered into the Reference Shift Register, 13 while the Data elements are entered into the Data Shift Register, 12. The value of each stage in the Reference shift register is multiplied by the value of the corresponding stage in the data shift register in one of the four quadrant multipliers 11. The products of all multipliers are entered into the summing bus 14 and thence to the summing device 15. The summation of all 1023 products, for one delay τ, are generated simultaneously and appear at the output of summing device 15. The time required to perform the correlation is reduced by 2·1023, to 0.020 seconds. A notable improvement but at the cost of great complexity, cost and power dissipation. The process is illustrated in Table VII below.

TABLE VII

Product Terms in Matched Filter Correlator. FIG. 2b

| Chip | Data | SSC | Product Accumulation |
|------|------|-----|----------------------|
| 107 | D(2) ... D(i + 1025) | R(0) ... R(1023) | $\Sigma D(2 + n)*R(n)$<br>n = 0<br>n = 1023 |

TABLE VII-continued

Product Terms in Matched Filter Correlator. FIG. 2b

| Chip | Data | SSC | Product Accumulation |
|------|------|-----|----------------------|
| 107 | D(3) ... D(i + 1026) | R(0) ... R(1023) | $\Sigma D(3 + n)*R(n)$<br>n = 0<br>n = 1023 |
| 107 | D(4) ... D(i + 1027) | R(0) ... R(1023) | $\Sigma D(4 + n)*R(n)$<br>n = 0<br>n =1023 |
| 107 | D(5) ... D(i + 1028) | R(0) ... R(1023) | $\Sigma D(5 + n)*R(n)$<br>n = 0 |

It is an objective of this invention to provide multiple simultaneous parallel correlations and to thereby minimize the time required for identification of the reference sequence (s) in use and establish synchronization.

Tracking the Data Signal

The process of acquisition has been described above. Once the data signal is acquired the correlator must be applied to track the signal. Tracking is necessary since without intervention the receiver frequencies would eventually drift enough to cause a loss of synchronization and require repeated acquisition operation. To obviate the need for reacquisition the prior art has developed devices such as the delay lock discriminator. This device generates the reference sequence as determined by the acquisition process at several delays both greater and smaller than delay determined by the acquisition process. Correlation results for the greater delays are aggregated and subtracted from an aggregation of smaller delays to form the output of the delay lock discriminator. The output of the discriminator trend positive as the delay becomes too long and negative as the delay becomes too short. This result is used to adjust the clock frequency of the receiver to maintain synchronization.

It is a further objective of this invention to provide a means and a method for acquiring the signal which can be converted electrically to a means and a method for tracking several of the signals acquired.

This invention provides improvements in the serial correlator of FIG. 2a by adding the capability for multiple, simultaneous, parallel correlations. At the same time the invention avoids the intractable complexity of the fully matched filter correlator of FIG. 2b. In addition, this invention provides a means by which the degree of parallelism may be selected according to the application to provide a "best value" solution for a particular application.

Detailed Description of the Preferred Embodiment

The invention can best be understood by first examining FIG. 3 which illustrates multiple delay cross-correlation processing. In FIG. 3, the elements of a data stream enter the serial port of a four stage shift register, 30. The four parallel outputs of the shift register are each connected to the inputs of a multiplexer 31. The multiplexer selects one input and connects it to one data input of the ALU, 32. The output from the ALU is distributed by Demultiplexer, 33 to the input of one of the registers 34 which serve as one word memories. Multiplexer 35 selects the output of one of the registers and connects it to the second data input of ALU 32. The multiplexer and demultiplexer act quickly, sequentially connecting each element of the shift register to the ALU and each memory output to the ALU within the signal spreading code (SSC) chip time. As in FIG. 2a the ALU mode, add or subtract is controlled by the Reference SSC applied to the control terminal, +/− of the ALU. The multiplexed Data elements are added or subtracted from the existing value in the selected register. The result is restored to same register. The effect is to multiply the current data element by the current SSC element and add the result to the selected register. Within the Reference SSC chip time each of the 4 data element values stored in the shift register is multiplied by the SSC chip and the result is added to the value in the selected register.

The indicated product, f(t)·g(t+τ) is a four quadrant function which can be implemented in a number of ways as a function of how f( ) is represented. Note that f( ) and g( ) can be interchanged without changing the functionality. In the simplest case, where f( ) is expressed as a binary number, the ExNOR function may be used. In a more complex case a four quadrant digital multiplication may be used In the preferred implementation the multiplication is implemented by noting that g( ) is always a binary function even though f( ) may be binary or a multi bit digital number. Since g( ) is either +1 or −1 the multiplication can be implemented by using an arithmetic logic unit, ALU, and causing g( ) to cause either addition or subtraction. This configuration is shown as the preferred embodiment however the use of other multiplication means, ExNOR or Four Quadrant Multiplier does not change the nature of the invention and should be considered to be within the scope of the invention.

The results are as follows: the four most recent element of the Data sequence are multiplied by the current value of the Reference sequence and added to the corresponding memory output and stored back in the memory. The memories operate at twice the speed of the multiplexers, first reading a value from the current location then writing the modified value into that same location changing the address to that of the next location.

The results can be further understood with the aid of the Table VIII below. The Data and SSC elements occur at the same rate as in the illustration of the serial correlator above. Here, between each Data and SSC entry, the multiplexers, multipliers and memories act four times. The result is shown in Table VIII. Note that the result of Table VIII is obtained only when the connections from the data shift register to the multiplexer groups are suitably arranged.

In the end each of the memories accumulates a correlation at a different delay. Since the correlator is intended to search through a number of delays, the method of this invention provides the delay search at four times the speed of the serial correlator and 1/256th the speed of the matched filter correlator.

As the process continues the sums developed in the memories are the correlations of the Reference SSC and Data series for 4 different delays just as it is done in the exhaustive matched filter correlator described above.

It is important to note that the above sequence of product terms is not an obvious progression of the serial correlator or a regression from the matched filter correlator. The improved correlator occupies a unique position intermediate between the serial correlator a slow and not easily enhanced and the matched filter correlator, fast but complex and not easily scaled back.

Figure 3B:
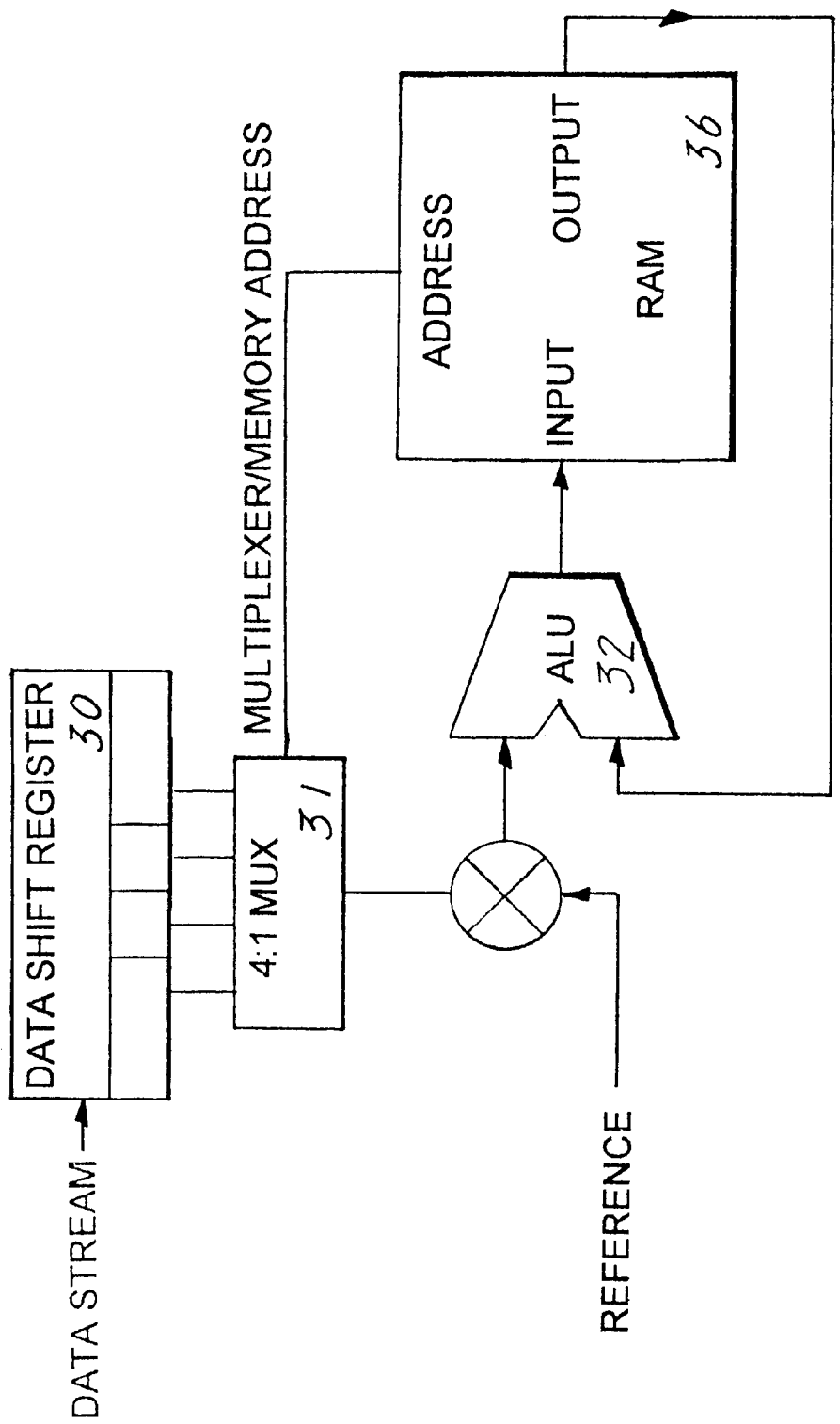
FIG. 3b Improved Correlator with Four Quadrant Multiplier and RAM

FIG. 3b Illustrates the identical process to that of FIG. 3a. It is provided to illustrate a compact implementation where the demultiplexer 33, registers 34 and second multiplexer 35 are replaced by random access memory,

TABLE VIII

Product Terms in this Improved Correlator

| Data | SSC | Product Accumulation |
|---|---|---|
| R(i + 2) | D(j + 17) | |
| | | Mem(4) = R(i + 2) · D(j + 17) + Mem(4) |
| | | Mem(3) = R(i + 2) · D(j + 16) + Mem(3) |
| | | Mem(2) = R(i + 2) · D(j + 15) + Mem(2) |
| | | Mem(1) = R(i + 2) · D(j + 14) + Mem(1) |
| R(i + 3) | D(j + 18) | |
| | | Mem(4) = R(i + 3) · D(j + 18) + Mem(4) |
| | | Mem(3) = R(i + 3) · D(j + 17) + Mem(3) |
| | | Mem(2) = R(i + 3) · D(j + 16) + Mem(2) |
| | | Mem(1) = R(i + 3) · D(j + 15) + Mem(1) |
| R(i + 4) | D(j + 19) | |
| | | Mem(4) = R(i + 4) · D(j + 19) + Mem(4) |
| | | Mem(3) = R(i + 4) · D(j + 18) + Mem(3) |
| | | Mem(2) = R(i + 4) · D(j + 17) + Mem(2) |
| | | Mem(1) = R(i + 4) · D(j + 16) + Mem(1) |
| R(i + 3) | D(j + 18) | |
| | | Mem(4) = R(i + 5) · D(j + 20) + Mem(4) |
| | | Mem(3) = R(i + 5) · D(j + 19) + Mem(3) |
| | | Mem(2) = R(i + 5) · D(j + 18) + Mem(2) |
| | | Mem(1) = R(i + 5) · D(j + 17) + Mem(1) |
| . . . | . . . | . . . . . . . . . . . . |

RAM, 36. Those skilled in the art will recognize that the referenced demultiplexer register multiplexer arrangement is essentially the structure of a RAM.

FIG. 3b further illustrates multiplication using a four quadrant multiplier separate from the accumulator RAM arrangement. FIGS. 2 and 3 then illustrate multiplication by ExNOR, Four Quadrant Multiplier and SSC controlled ALU.

Figure 4:
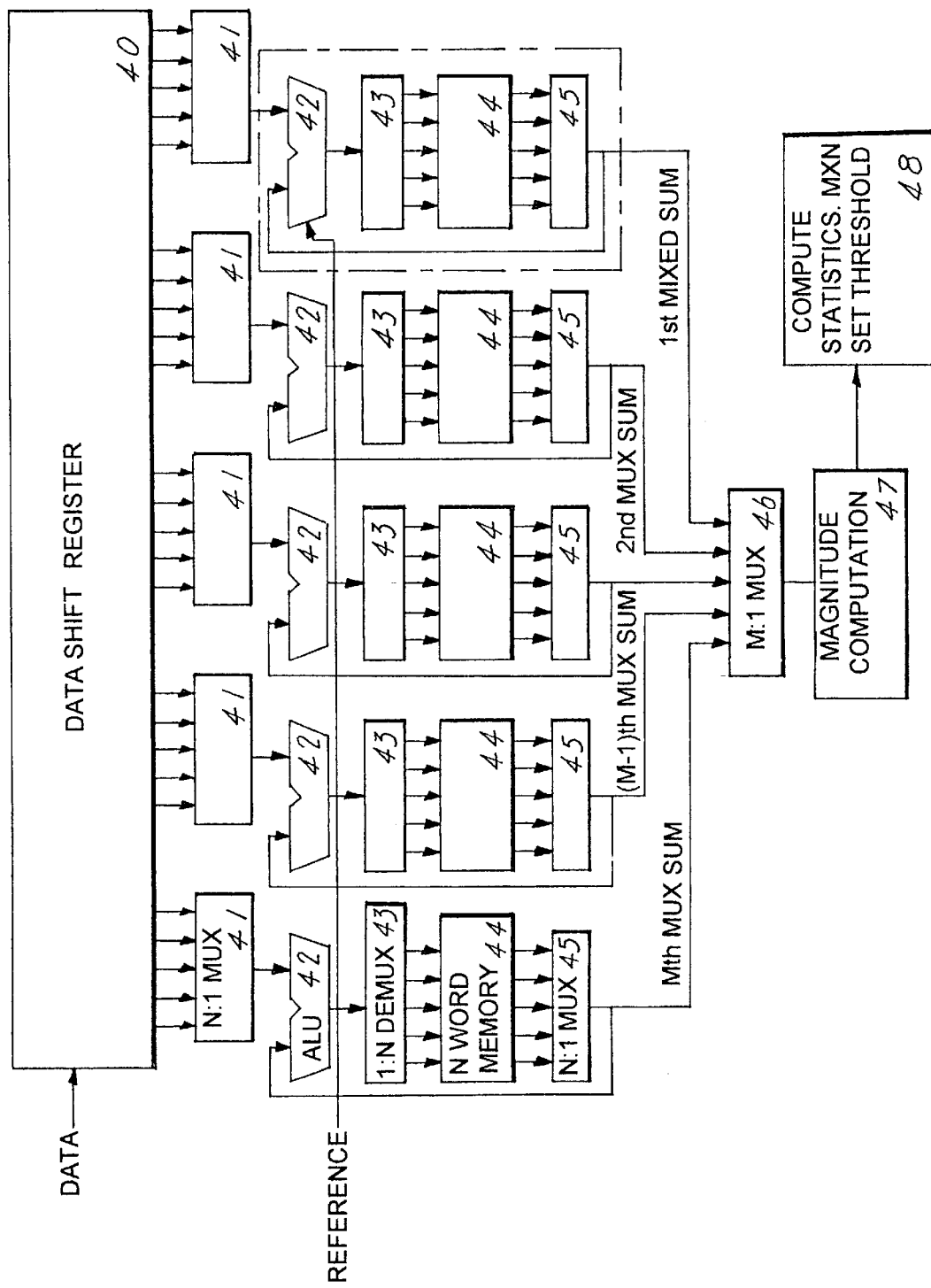
FIG. 4 Preferred Embodiment of Improved Correlator

The preferred embodiment of this invention is shown FIG. 4. The embodiment of FIG. 4 multiplies using the controlled ALU and accumulation in multiplexed registers. It should be understood that the other multiplication methods described above or the RAM storage described above could be used equally well in this embodiment.

The primary importance of FIG. 4 is flexibility of the concept, its ability to provide a capability intermediate between the serial correlator and matched filter of the prior art. This capability is not present in the prior art from those concepts. The user who wishes to expand capability of the serial correlator or the matched filter has only one option, that is to add more circuits of the same kind. Neither can take advantage of the increased speed capability of modern circuit elements since they are tied to chip rate of the Data. The preferred embodiment of this invention allows that flexibility.

This flexibility can best be understood with reference to FIG. 4. The Data enters the data shift register 40, continuously at its clock rate. Shift register 40 is of arbitrary length, here indicated as M×N, where M is the number of partitions and N is the number of Data elements in each partition.

(Note that FIG. 4 does not show all elements in detail and only the components corresponding to the left most processing element are shown. M such processing elements are indicated and corresponding components of all processing elements are identical.) Connected to the register are M processing circuits each consisting of an input Multiplexer 41, ALU 42, acting as multiplication means, Demultiplexer 43, an N word Memory 44, consisting of N registers and an output multiplexer 45.

Each input multiplexer 41 has access to a partition N stages of the Data Shift Register. The multiplexers and Demultiplexers are driven at N times the chip rate and every element in the processing circuits is capable of operating at N times during each chip of the SSC. The reference SSC is connected to the control port, +/− of each ALU 42. This element of the SSC multiplies each of the M×N elements of the Data stored in the input shift register 40 during the SSC chip time. The accumulations of each multiplication appear sequentially at the outputs of the M multiplexers 45, and are labeled the 1st through the Mth Muxed Sum.

The multiplexed sums are multiplexed onto a single conduit by multiplexer 46. This conduit contains a sequential sampling of each of the M×N multiplexed sums. These multiplexed sums are in fact the cross correlation products for delays 1 through M×N. The sequence is completed during a single chip time of the SSC, and therefore operates at an effective rate equal to the SSC chip rate×M×N.

FIG. 1 indicates that the correlator operates on a data word comprising I and Q heterodyne products. The output conduit of multiplexer 46 contains the I and Q correlation products. These products are transformed to Magnitude and Phase by the magnitude computation, 47, the phase term may be made available but is not commonly used. The Compute Statistics function, 48, monitors the magnitude function and indicates for which delay if any of it exceeds the correlation threshold (by also selecting the largest magnitude over the delays). A magnitude greater than threshold signal indicates that the trial SSC has been found in the data and its relative delay. This completes the acquisition function for one SSC. Another of the SSC which may be present is selected and the process is repeated.

Failure to reach threshold after an appropriate time, indicates that either that the trial SSC is not present or that the proper delay has not been found. The number of possible delays corresponds to the number of chips in the SSC, the embodiment of FIG. 4 tests only M×N of these delays. The trial SSC is displaced by M×N chips and the process is repeated until a threshold is reached or until the number of delays has been exhausted.

Each processing block, made up of components 42–45, is similar to the processing block of FIG. 3b. FIG. 4 is then made up of N such processing blocks according to FIG. 3b, each such block is connected to the data shift register 40, by the input multiplexers 41 with output formed by, multiplexers 45; each being identified as a Muxed Sum.

The preferred embodiment provides flexibility to the user in both the number of stages N×M, the number of processing blocks or partitions N and the width of each block M. It is important to realize that the number of stages in the Data Shift Register is not limited but can be extended indefinitely to suit the speed requirements and complexity limitations of a particular application. The acquisition time in such a configuration is reduced by a nominal factor M×N relative to a serial cross correlator found in the prior art.

One possible configuration, capable of performing 60 simultaneous correlations would employ 12 processing blocks each with a span of 5 data elements. The result is a 60 fold decrease in processing time. The 41 seconds estimated for the single serial correlator is reduced to 0.70 seconds. In addition it provides the advantage of examining 60 delays simultaneously. Note the distinction between this and the possible modification of the basic parallel correlator of the prior art FIG. 2 to a length of 60. That modification would provide the same 60 fold decrease in overall processing time but with more processing hardware and more complex interconnectivity. Both provide the unique advantage of scanning 60 adjacent delays. The results from these correlations, even though partial, may provide sufficient information to allow selecting a new reference sequence early in the search process. Also note that the reference sequence is not stored in a shift register so that an alternate sequence may be substituted very quickly.

Tracking Application

Refer again to Table VIII and to FIG. 4. FIG. 4 is provided to illustrate that by a minor modification the structure of FIG. 4 provides a means of simultaneously tracking several SSCs. This transition between acquisition and tracking is appropriately made immediately after the presence or absence of all possible SSCs, timing and Doppler has been made and identified. At that time the identified SSCs are generated with appropriate delays as determined in the acquisition process. The properly delayed codes are applied, one to each processing block at the control terminal of the ALU, +/−. In FIG. 4 these SSC inputs were driven by a single trial SSC, a configuration to minimize the time acquisition. In tracking, these individual SSCs replace the single trial SSC which was applied to all processing block ALUs during the acquisition process.

In the tracking application the outputs frotn each of the processing blocks, identified in FIG. 4 as the $1^{st}$ through the $M^{th}$ Muxed Sum provide tracking data for the SSC applied to that block. These multiplexed sums scan out correlation result for N delays covered by the associated input shift register partition. They are the cross correlation result of data and identified reference SSC over a span of delays from less than to greater than the acquired delay. The nominal result is that the cross correlation result increases as the delay error magnitude decreases, reaching a maximum at the correct delay. This behavior is indicated in Table IX below for a case where the correct delay is properly centered in the span of a 7 delay processor block.

TABLE IX

Cross-Correlation Result
Acquisition Mode

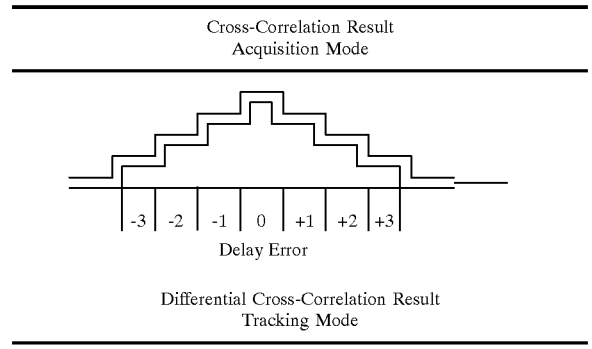

Differential Cross-Correlation Result
Tracking Mode

TABLE IX-continued

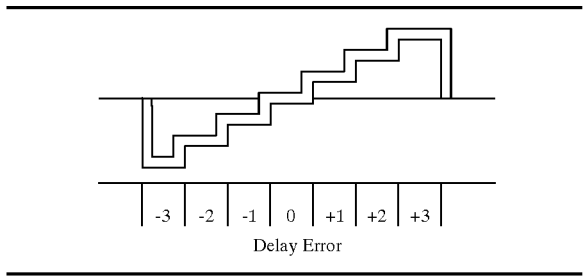

Delay Error

If the cross correlation results for positive delay errors is subtracted from the cross correlation results for negative delay errors, a delay error detector is implemented. The magnitude and sign of this result corresponds to the magnitude and sign of the delay error. The delay error thus detected can be utilized to track and correct slow changes in delay error for the individual SSC and maintain synchronism. Improved delay resolution, sometimes required in tracking operation, may be obtained by increasing the clock frequency used.

The architecture presented herein can be extended in obvious manner to correlate arbitrary digital waveform references to like waveforms that can be found in the received signals. The extension amounts to inserting four quadrant multiples at the control inputs of the ALV's and feeding a sample and digitized reference waveform samples to one input of the multiplier instead of the binary code sequence. (In the binary case multiplication by one renders the multipliers redundant).

In effect, an efficient arbitrary waveform matched filter is then mechanized.

TABLE X

Product Terms in this Improved Correlator

| Data | SSC | Product Accumulation |
|---|---|---|
| $D(j)$ | $R(1,j)$ | |
| | | $Mem(4) = R(1,j) \cdot D(i + 17) + Mem(4)$ |
| | | $Mem(3) = R(1,j) \cdot D(i + 16) + Mem(3)$ |
| | | $Mem(2) = R(1,j) \cdot D(i + 15) + Mem(2)$ |
| | | $Mem(1) = R(1,j) \cdot D(i + 14) + Mem(1)$ |
| $D(j + 4)$ | $R(1,j)$ | |
| | | $Mem(4) = R(2,j) \cdot D(i + 18) + Mem(4)$ |
| | | $Mem(3) = R(2,j) \cdot D(i + 17) + Mem(3)$ |
| | | $Mem(2) = R(2,j) \cdot D(i + 16) + Mem(2)$ |
| | | $Mem(1) = R(2,j) \cdot D(i + 15) + Mem(1)$ |
| ... | ... | ............ |
| $D(j + (M - 1)N + 1)$ | $R(q,j)$ | |
| | | $Mem(4) = R(q,j) \cdot D(i + 19) + Mem(4)$ |
| | | $Mem(3) = R(q,j) \cdot D(i + 18) + Mem(3)$ |
| | | $Mem(2) = R(q,j) \cdot D(i + 17) + Mem(2)$ |
| | | $Mem(1) = R(q,j) \cdot D(i + 16) + Mem(1)$ |

TABLE X-continued

Product Terms in this Improved Correlator

| Data | SSC | Product Accumulation |
|---|---|---|
| $D(j + (M - 2)N + 1)$ | $R(r,j)$ | |
| | | $Mem(4) = R(r,j) \cdot D(i + 20) + Mem(4)$ |
| | | $Mem(3) = R(r,j) \cdot D(i + 19) + Mem(3)$ |
| | | $Mem(2) = R(r,j) \cdot D(i + 18) + Mem(2)$ |
| | | $Mem(1) = R(r,j) \cdot D(i + 17) + Mem(1)$ |

I claim:

1. A correlator for correlating a spread spectrum signal against a trial reference signal spreading code, said correlator comprises:

a) a data shift register (40) comprises M×N registers for storing a digital incoming input data stream, and shifting the data through, one register at a time for each one clock of the data stream signal, and each of the registers has a conduit output where the total conduit outputs of the registers are grouped in M sequential groups of N sequential registers and each parallel conduit output is indexed m for group 1 to M, and within the group indexed n for 1 to N;

b) a plurality of M multiplexers (41) each for routing each of the N register's parallel conduit outputs to a single output of each multiplexer (41), one conduit at time, within one data stream clock;

c) a plurality of M arithmetic logic units (42) for multiplying, within one data stream clock, each of the N single conduit outputs of the multiplexer (41) with the trial reference signal spreading code, that is provided simultaneously to all the M arithmetic logic units for the duration of the clock of the data stream signal, and adding the result to a total accumulation digital word to create a new total accumulation digital output word for the n indexed conduit;

d) a plurality of M word demultiplexers (43), each operating simultaneously with multiplexers (41), for routing each of the N new total accumulation digital word output of the arithmetic logic unit to N word memory unit;

e) a plurality of M N word memory units (44) for storing the new total accumulation digital output word of each one of the N conduits;

f) a plurality of M multiplexers (45), each operating simultaneously with multiplexers (41), for routing, within one data stream clock, each of the N new total accumulation digital output words to the arithmetic logic unit as the total accumulation digital word;

g) a multiplexer (46) for routing the N total accumulation digital output words from each of the M multiplexers (45) to a magnitude computation unit (47);

h) a magnitude computation unit (47) for storing all the M×N total accumulation digital word for each of the M×N conduits and calculating a magnitude for each one;

i) a compute statistics unit (48) for finding the indexes m and n, and value of the largest magnitude conduit from all the M×N calculated magnitudes.

2. The correlator according to claim 1 wherein said correlator is applicable for use in Global Positioning System (GPS) recnivers or spread sperctrum telecommunications for fast acquisition and tracking the spectrum spreading codes.

\* \* \* \* \*